No. 689,515. Patented Dec. 24, 1901.
R. RAKESTRAW.
ROTARY HARROW.
(Application filed Nov. 8, 1900.)
(No Model.)
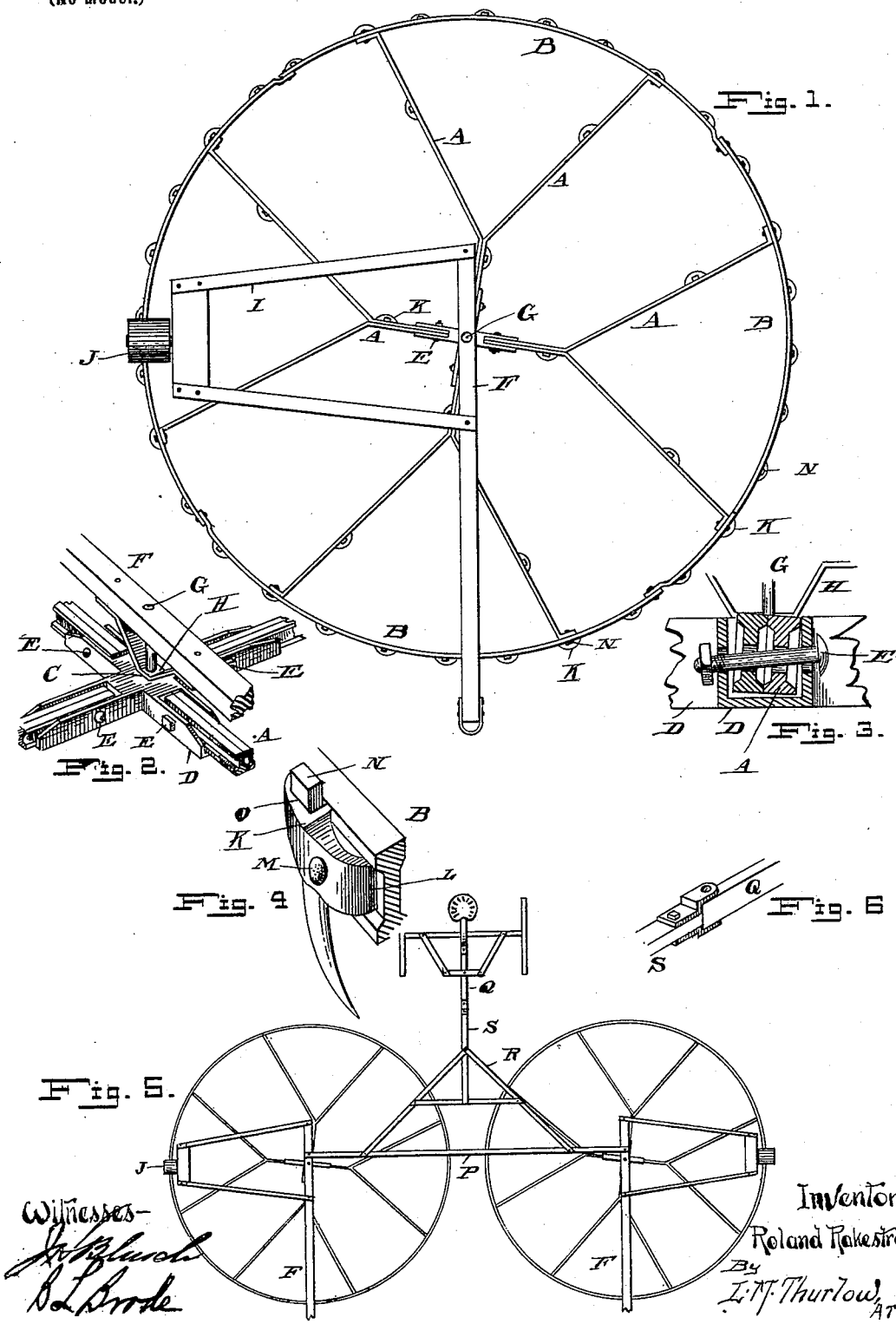
Witnesses—
Inventor.
Roland Rakestraw,
By I. M. Thurlow, Atty.

UNITED STATES PATENT OFFICE.

ROLAND RAKESTRAW, OF WYOMING, ILLINOIS.

ROTARY HARROW.

SPECIFICATION forming part of Letters Patent No. 689,515, dated December 24, 1901.

Application filed November 8, 1900. Serial No. 35,790. (No model.)

*To all whom it may concern:*

Be it known that I, ROLAND RAKESTRAW, a citizen of the United States, residing at Wyoming, in the county of Stark and State of Illinois, have invented certain new and useful Improvements in Rotary Harrows; and I do hereby declare that the following is a full, clear, and exact description of the invention, which will enable others skilled in the art to which it appertains to make and use the same.

This invention relates to improvements in rotary harrows, and has for its object to better this class of farm implements by providing a more simple construction.

The further object is to provide an improved form of a central portion or union which receives the harrow-sections, as will be hereinafter described.

Furthermore, an object is to locate the teeth or spikes of the harrow more upon the circular rim of the implement than upon the reaches or limbs of the sections composing the harrow, the purpose of which will be explained as the description proceeds.

Still another object of the invention is to attach to the harrow in a peculiar manner a "rider" or seat mounted on wheels for the use of the operator.

Another object is to provide a peculiar form of harrow-section.

In the appended drawings, which form a part of this application, Figure 1 is a plan view of the harrow. Fig. 2 is a perspective view of a center piece or "union" which supports the harrow-sections. Fig. 3 is a cross-sectional view of one of the limbs of the said union. Fig. 4 is a perspective view of a tooth and clamp affixed to a portion of the harrow. Fig. 5 is a plan view of the two harrows connected together and having a rider for the use of the operator attached thereto. Fig. 6 is a perspective view of a connection between the harrow and the said rider.

The complete harrow is made up of sections composed of the beams A A, having their ends united at the center of the harrow and diverging therefrom and attached at the divergent ends to a curved limb-section B, as shown in Fig. 1. These portions are preferably constructed of angle-iron, and the curved rim-sections when placed together form a complete circle. The ends of the sections are loosely connected by bolts or rivets in any desired manner to form a pivoted joint. I prefer to do this by lapping the ends and pivoting them by means of a bolt passed therethrough, though of course other means may be employed. The inner ends of the sections where united are held by means of a union consisting of a casting (shown in Fig. 2) whose center C is of solid metal, the projecting limbs or arms D of which are U-shaped in cross-section, as shown in Fig. 3. The united ends of the beams A are introduced to the arms D and are loosely held therein by means of bolts E. The arms and the ends of the sections are drilled transversely, and through the holes thus drilled the said bolts E are passed, the latter being much smaller in diameter than the holes, whereby the harrow-sections may tip freely in all directions. Fig. 3 shows the relative size of the bolts and bores and also shows the lateral movement of the harrow-section.

The draft-rod F lies immediately above the center of the harrow and is pivotally connected therewith by means of a king-bolt G, being supported by means of a stirrup or chair H. To the draft-rod is secured a frame I, carrying a roller J, adapted to rest upon the circle rim B. To this portion, however, I lay no claim, as it is commonly used on rotary harrows.

The teeth or spikes on the harrow I locate mostly upon the rim B and place a very limited number of them upon the beams A of the sections. In fact, I merely place sufficient of them upon the said beams to properly support the center of the harrow. It has been demonstrated that by placing the teeth mostly upon the rim better results are obtained, for the reason that they distribute the rubbish and green stalks more thoroughly and the draft on the horses is very much lighter. The work done in smoothing the land is also superior to that of other harrows wherein the teeth are distributed freely toward the center, and this improved setting of the teeth I wish to claim as my own. The tooth-fastening which I employ is clearly shown in Fig. 4, in which a casting K is secured to the beam, and a tongue L at one end is seated in the groove of the said beam, which acts as a lock for said casting. A bolt M passes through both beam and casting and clamps the tooth or the spike N, which is held within a notch O, firmly against the said beam.

In Fig. 5 I have illustrated two harrows connected by means of a bar P. A rider Q is connected with this rod and is intended for the use of the operator. This idea is old; but my method of connecting the rider with the harrow I believe to be new. An A-frame R is rigidly attached to the bar P and carries a beam S at its apex at right angles to said bar. The rider before mentioned consists of a suitable frame mounted on wheels and carries a seat for the operator. The beam Q of this rider is pivoted to the beam S of the harrow-frame substantially as shown in Fig. 6, although I do not desire to confine myself to any particular method of connecting these parts. Usually the rider is pivoted directly to the beam P, and when the harrow makes a sharp turn the wheels thereof interfere with the rim thereof. To obviate this, I have provided the construction described.

It is understood that by making a loose connection between the harrow-sections these parts will readily rise and fall with the uneven surface of the ground, and the pivoted connections between the sections are provided, so that there will be no interference with these movements.

I claim—

1. In a harrow, the combination of a central support having radial U-shaped arms, in combination with harrow-sections whose extremities rest within the said arms, and bolts passed through the arms and sections in a loose manner to permit the said sections to have free lateral movement as set forth.

2. In a harrow, a central support consisting of a series of U-shaped arms D having the solid center C to which the draft-bar is attached, harrow-sections consisting of the beams A A secured together at their inner ends and lying within the said arms D, a bolt E passing through the said arms and beams but permitting the harrow-sections to have free movement, the rim-sections B secured to the divergent ends of the said beams A, the ends of the several sections being pivotally connected, and a series of teeth mounted on the said rim-sections substantially as set forth.

3. In a harrow, a central support composed of the U-shaped arms D radiating from a central point, a series of harrow-sections lying in said arms and composed of the arms A A and the rim-sections B connected as set forth, bolts for holding the said sections within the arms, the holes in the arms and sections being larger than the bolts whereby the sections are given free movement as described and for the purposes set forth.

In testimony whereof I affix my signature in presence of two witnesses.

ROLAND RAKESTRAW.

Witnesses:
 JOHN W. WALTERS,
 G. S. RAKESTRAW.